United States Patent
Nichols

(10) Patent No.: US 10,601,882 B2
(45) Date of Patent: *Mar. 24, 2020

(54) SYSTEM, METHOD AND APPARATUS FOR BINDING COMMUNICATION DEVICES THROUGH COMMON ASSOCIATION

(71) Applicant: Ademco Inc., Golden Valley, MN (US)

(72) Inventor: Steven Nichols, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/955,568

(22) Filed: Apr. 17, 2018

(65) Prior Publication Data

US 2018/0241789 A1 Aug. 23, 2018

Related U.S. Application Data

(63) Continuation of application No. 14/961,688, filed on Dec. 7, 2015, now Pat. No. 9,979,763, which is a
(Continued)

(51) Int. Cl.
*H04L 29/06* (2006.01)
*H04L 29/08* (2006.01)
(Continued)

(52) U.S. Cl.
CPC ........ *H04L 65/4076* (2013.01); *H04L 9/0833* (2013.01); *H04L 61/6081* (2013.01);
(Continued)

(58) Field of Classification Search
CPC ......... H04L 9/08; H04L 9/0833; H04L 29/06; H04L 29/08; H04L 29/12; H04L 61/6081;
(Continued)

(56) References Cited

U.S. PATENT DOCUMENTS

| | | |
|---|---|---|
| 5,463,659 A | 10/1995 | Nealon et al. |
| 5,758,290 A | 5/1998 | Nealon et al. |

(Continued)

FOREIGN PATENT DOCUMENTS

| | | |
|---|---|---|
| CN | 1941942 | 4/2007 |
| CN | 101253508 | 8/2008 |

(Continued)

OTHER PUBLICATIONS

Baronti et al., "Wireless Sensor Networks: A Survey on the State of the Art and 802,15.4 and Zigbee Standards," Computer Communications, vol. 30, pp. 1655-1695, 2007.
(Continued)

*Primary Examiner* — Tri H Phan
(74) *Attorney, Agent, or Firm* — Shumaker & Sieffert, P.A.

(57) ABSTRACT

Systems, methods and apparatuses for binding two or more communication devices through their common association with one or more other devices. Information associated with a common device is stored at a first device. The information associated with the common device is also stored at a second device. A message is transmitted from the first device using the stored information as at least part of a broadcast address identifier. The message can then be accepted at the second device as a result of the information being known to the second device. A "binding by association" is thus effected by virtue of each of the first and second devices having been privy to the same information affiliated with the common device.

20 Claims, 7 Drawing Sheets

Related U.S. Application Data continuation of application No. 12/253,696, filed on Oct. 17, 2008, now Pat. No. 9,210,125.

(51) Int. Cl.
*H04L 29/12* (2006.01)
*H04L 9/08* (2006.01)
*H04W 76/00* (2018.01)
*H04W 8/26* (2009.01)

(52) U.S. Cl.
CPC .............. *H04L 67/16* (2013.01); *H04W 8/26* (2013.01); *H04W 76/00* (2013.01)

(58) Field of Classification Search
CPC . H04L 65/4076; H04L 67/16; H04L 41/0806; H04L 41/0843; H04L 41/0856; H04L 41/0866; H04W 8/26; H04W 76/00; G06F 9/00; G06F 9/44; G06F 15/17; G06F 15/173; G06F 15/177
See application file for complete search history.

(56) References Cited

U.S. PATENT DOCUMENTS

| | | |
|---|---|---|
| 5,927,599 A | 7/1999 | Kath |
| 6,028,885 A | 2/2000 | Minarik et al. |
| 6,213,404 B1 | 4/2001 | Dushane et al. |
| 6,535,493 B1 | 3/2003 | Lee et al. |
| 6,700,920 B1 | 3/2004 | Partyka |
| 6,778,902 B2 | 8/2004 | Hathiram et al. |
| 6,859,450 B1 | 2/2005 | Mansfield |
| 6,870,875 B1 | 3/2005 | Partyka |
| 6,925,105 B1 | 8/2005 | Partyka |
| 7,050,906 B2 | 5/2006 | Hathiram et al. |
| 7,120,148 B1 | 10/2006 | Batz et al. |
| 7,143,213 B2 | 11/2006 | Need et al. |
| 7,224,713 B2 | 5/2007 | Partyka |
| 7,227,863 B1 | 6/2007 | Leung et al. |
| 7,284,205 B2 | 10/2007 | Need et al. |
| 7,301,986 B2 | 11/2007 | Partyka |
| 7,386,856 B2 | 6/2008 | Need et al. |
| 7,512,088 B1 | 3/2009 | Dommety |
| 7,535,927 B1 * | 5/2009 | Northrup .................. G06F 9/54 370/469 |
| 7,701,883 B2 * | 4/2010 | Beckemeyer ..... H04L 29/12103 370/260 |
| 7,751,391 B2 * | 7/2010 | Boden ................ H04L 12/4641 370/389 |
| 7,778,927 B2 | 8/2010 | Kawakami |
| 7,813,372 B2 | 10/2010 | Yoshida |
| 7,827,402 B2 * | 11/2010 | Smith .................. H04L 63/101 713/151 |
| 7,852,904 B2 | 12/2010 | Black et al. |
| 7,916,721 B1 | 3/2011 | Breau et al. |
| 8,023,440 B2 * | 9/2011 | Nass .................. G05B 19/0423 340/10.1 |
| 8,254,910 B1 | 8/2012 | Breau et al. |
| 8,385,384 B1 | 2/2013 | Kidder et al. |
| 8,437,276 B2 * | 5/2013 | Dinur ................ H04L 41/0806 370/254 |
| 8,553,743 B1 | 10/2013 | Nichols et al. |
| 8,677,342 B1 | 3/2014 | Kidder et al. |
| 8,788,823 B1 * | 7/2014 | Huang .................. H04L 63/10 713/170 |
| 8,891,586 B1 | 11/2014 | Nichols |
| 9,030,315 B2 | 5/2015 | Hendrix et al. |
| 9,043,473 B1 | 5/2015 | Breau et al. |
| 9,210,125 B1 | 12/2015 | Nichols |
| 9,231,783 B2 * | 1/2016 | Lynch ................ H04L 12/6418 |
| 9,979,763 B2 | 5/2018 | Nichols |
| 10,200,235 B2 * | 2/2019 | Pfaff .................. G06F 16/2282 |
| 2002/0143855 A1 * | 10/2002 | Traversat .............. G06F 9/4416 709/202 |
| 2004/0013099 A1 | 1/2004 | O'Neill |
| 2005/0047383 A1 | 3/2005 | Yoshida |
| 2006/0154598 A1 | 7/2006 | Rudland et al. |
| 2006/0227852 A1 | 10/2006 | Black et al. |
| 2007/0053334 A1 | 3/2007 | Sueyoshi et al. |
| 2007/0291822 A1 | 12/2007 | Staley et al. |
| 2008/0056722 A1 | 3/2008 | Hendrix et al. |
| 2008/0125057 A1 * | 5/2008 | Nass .................. G05B 19/0423 455/73 |
| 2009/0151006 A1 | 6/2009 | Saeki et al. |
| 2010/0191839 A1 | 7/2010 | Gandhewar et al. |
| 2011/0103260 A1 | 5/2011 | Jeyatharan et al. |
| 2012/0117247 A1 | 5/2012 | Carruthers |

FOREIGN PATENT DOCUMENTS

| | | |
|---|---|---|
| CN | 101843153 | 9/2010 |
| CN | 102067636 | 5/2011 |
| WO | 2006009215 | 1/2006 |

OTHER PUBLICATIONS

Calhoun et al., "Control and Provsioning of Wireless Access Points (CAPWAP) Protocol Binding for IEEE 802.11," http://tools.ietf.org/html/rfc5416, 76 pages, Mar. 2009.
Cisco Systems, Inc. "AP Group VLANs with Wireles LAN Controllers Configuration Example," Document ID: 71477, 17 pages, updated Jan. 21, 2008.
Connor et al., "IEEE 802.11s Tutorial, Overview of the Amendment for Wireless Local Area Mesh Networking," IEEE 802 Plenary, Dallas, 93 pages, Nov. 13, 2006.
Dutta et al., "SMACK—A SMart ACKnowledgment Scheme for Broadcast Messages, in Wireless Networks," SIGCOMM '09, pp. 15-26, Aug. 17-21, 2009.
Echelon Corporation, "LonTalk Protocol Specification," Version 3, 112 pages, 1994.
North Beach Consulting, LLC, "LonWorks Fundamentals, A Guide to a Basic Understanding of the LonTalk Protocl," 10 pages, 2003.
Papageorgiou, "Literature Survey on Wireless Sensor Networks," 15 pages, Jul. 16, 2003.
"Programming with Sockets," Transport Interfaces Programming Guide, 48 pages, Nov. 1995.
Ren et al. "On Broadcast Authentication in Wireless Sensor Networks," IEEE Transactions on Wireless Communications, vol. 6, No. 11, pp. 4136-4144, Nov. 2007.
Reynoso et al. "Using IP Multicasting with the TMS320C6000 Network Developer's Kit (NDK)," Texas Instruments, Application Report SPRAAI3, 12 pages, Feb. 2007.
Rivera, "Seamless Connectivity and Mobility in Wireless Mesh Networks," 101 pages, Sep. 2008.
Van Der Merwe et al., "Fully Self-Organized Peer-to-Peer Key Management for Mobile Ad Hoc Networks," WiSe, 10 pages, Sep. 2, 2005.
Vanzago "Overview on 802.15.4/Zigbee," DICO STMicroelectronics, 67 pages, May 2006.
Wotton, "Providing Reliable Sensing and Control Using Zigbee Wireless Networks," Sensing and Security, pp. 18-24, Jul. 2006.
Zucatto et al. "Zig Bee for Building Control Wireless Sensor Networks" International Microwave and Optoelectronics Conference, IEEE, pp. 511-515, 2007.
"Wireless Networks, Sensing and Security," pp. 18-24, Jul. 2006.
Prosecution History from U.S. Appl. No. 12/253,696, dated Apr. 1, 2011 through Jul. 31, 2015, 114 pp.
Prosecution History from U.S. Appl. No. 14/961,688, dated May 31, 2017 through Feb. 9, 2018, 51 pp.

* cited by examiner

SYSTEM, METHOD AND APPARATUS FOR BINDING COMMUNICATION DEVICES THROUGH COMMON ASSOCIATION

This is a continuation of co-pending U.S. patent application Ser. No. 14/961,688, filed Dec. 7, 2015 and entitled "SYSTEM, METHOD AND APPARATUS FOR BINDING COMMUNICATION DEVICES THROUGH COMMON ASSOCIATION", which is a continuation of U.S. patent application Ser. No. 12/253,696, filed Oct. 17, 2008 and entitled "SYSTEM, METHOD AND APPARATUS FOR BINDING COMMUNICATION DEVICES THROUGH COMMON ASSOCIATION", now U.S. Pat. No. 9,210,125, which is incorporated herein by reference.

FIELD OF THE INVENTION

This invention relates in general to device communication, and more particularly to systems, apparatuses and methods for binding two or more communication devices through their common association with one or more other devices.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. In more recent times more and more systems are employing wireless communication, which generally makes installation more convenient, and among other things provides greater flexibility and scalability.

A drawback to wireless communication is that information transfer is not confined to a wire, as in a direct wired system. Rather the information is sent over the air, which makes the transmitted information potentially perceivable by neighboring devices within the wireless transmission range. In order to address this issue, wireless network systems employ addressing schemes to ensure that transmitting devices can properly address targeted devices, and the targeted devices can reject information from neighboring devices that are not within their system but are within their reception range.

For a transmitting device to properly address target devices, the transmitting device must gain knowledge of the addresses of those target devices. This may be performed at the time of installation of the system devices. For example, system devices may each be temporarily set to a binding mode, such as by activating user interface mechanisms on each device. While in this active binding mode, address identifiers of the communication devices in binding mode can be exchanged so that the devices become aware of each other's addresses. This exchange of addresses and possibly other information is referred to herein as "binding" the devices to one another. After the appropriate address information has been exchanged, the devices exit the binding mode. By knowing each other's unique addresses, messages send during normal operation can be properly directed to intended recipients, and the intended recipients can determine if an incoming message originated from a sending device in its own system.

In order to perform such a binding procedure, an installer typically manipulates designated user interface (UI) mechanisms to enter the binding mode. However some devices may not be equipped with such UI mechanisms, or it is not economically desirable or feasible to equip them with these UI mechanisms. There may also be situations where a new device, or a device not originally designed to operate in the system, may need or want to communicate within the system. Such devices may not be configured to undergo the normal binding process, and therefore could not communicate with other devices of the system.

Additionally, there may be design reasons to have a certain device communicate with another device, yet binding such devices would not be intuitive to an installer due to the inconspicuous purpose. Even if instructions indicate to do so, installers may be confused as to why two devices should be bound where the function of those devices does not intuitively suggest a connection pair.

Accordingly, there is a need in the communications industry for a manner of binding two or more devices for at least the purpose of communicating information between the devices, without having to perform an initial binding procedure. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for binding two or more communication devices through their common association with one or more other devices.

In accordance with one embodiment of the invention, a method is provided that includes storing information associated with a common device at a first device. The same information associated with that common device is stored at a second device. A message(s) is transmitted from the first device using the stored information as at least part of a broadcast address identifier (ID). The message can then be accepted at the second device as a result of the information being known to the second device. Thus, a "binding by association" is effected by virtue of each of the first and second devices having been privy to that same information affiliated with the common device.

In one embodiment the method further involves receiving the transmitted message at the second device, and comparing the broadcast address ID of the message to the stored information at the second device. In this manner, accepting the message at the second device involves accepting the message at the second device if the received broadcast address ID matches the stored information at the second device.

Another embodiment of such a method involves transmitting the message from the first device by transmitting a broadcast message that utilizes the information associated with the common device as at least part of the broadcast address ID of the broadcast message. A more particular embodiment further involves transmitting a second address ID that will cause the common device to reject the broadcast message.

Yet another embodiment of the method further includes transmitting a second message from the second device using the stored information as at least part of a broadcast address ID, and accepting the second message at the first device as a result of the information being known to the first device.

Thus, in some embodiments, a device can operate as both a sending device and a receiving device.

In still another embodiment, the method further involves binding the first device to the common device to enable communication between the first device and the common device, and storing at the first device an address ID of the common device as the information associated with the common device. The second device is similarly bound to the common device to enable communication between the second device and the common device, and second device stores the address ID of the common device as the same information associated with the common device. In a more particular embodiment, transmitting the message from the first device involves using the address ID of the common device as the broadcast address ID.

In accordance with another embodiment of the invention, an apparatus is provided that includes storage configured to store an address identifier(s) of a first device(s) to which the apparatus has been configured for communication. A processor is configured to frame a broadcast message including using one of the stored address identifiers as a broadcast address. A transmitter receive the framed message, and wirelessly broadcasts the message using the broadcast address to a second device(s).

One embodiment of such an apparatus involves further configuring the processor to configure the apparatus for communication with the first devices via a binding process. In still another embodiment, the apparatus includes an environmental host device, and at least one of the first devices includes a sensor.

In still another embodiment, the apparatus further includes a receiver configured to receive an incoming broadcast message from one of the second devices, and a compare module configured to compare an incoming broadcast identifier in the incoming broadcast message to the stored address identifiers. The processor is further configured to accept the incoming broadcast message if the compare module identifies a match of the incoming broadcast address and any of the stored address identifiers.

In accordance with another embodiment of the invention, an apparatus is provided that includes storage configured to store one or more address identifiers of first devices to which the apparatus has been configured for communication. A receiver is configured to receive a wireless broadcast message that includes a broadcast address identifier. A compare module is configured to compare the received broadcast address identifier to the one or more stored address identifiers, and a processor accepts the received broadcast message if the compare module identifies a match of the broadcast address identifier and any of the stored address identifiers.

In one embodiment of such an apparatus, the processor is further configured to reject the received broadcast message if the compare module does not identify a match of the broadcast address identifier and any of the stored address identifiers.

Another embodiment of such an apparatus include configuring the processor to configure the apparatus for communication with the first devices via a binding process. In yet another embodiment, the processor is further configured to parse the received wireless broadcast messages to identify the broadcast address identifier. In still other embodiments, the apparatus is an environmental host device, and at least one of the first devices is a sensor.

A system is provided in accordance with another embodiment of the invention. The system includes a shared device having an address identifier. A first communication device includes storage to store the shared device's address identifier discovered by the first communication device during a binding process with the shared device. A second communication device also includes storage to store the shared device's address identifier discovered by the second communication device during a binding process with the shared device. The first communication device includes a transmitter configured to wirelessly broadcast one or more messages using the shared device's address identifier. The second communication device includes a receiver configured to wirelessly receive the one or more messages, and further includes a compare module configured to compare the received address identifier of the shared device to the stored address identifier of the shared device to accept the one or more messages in response to identifying a match.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for identifying intended communicants in a system(s) of communicating devices, without the need for the communicants to initially undergo a binding process to authorize communications therebetween. Aspects of the invention involve authorizing communications between a plurality of devices by way of their common association with another device(s).

While the invention can be implemented in wireless or wired environments, the description herein is directed to wireless embodiments. Devices may need to gain knowledge of the address(es) of other wireless devices that they can communicate with. This address information allows sending devices to address intended recipient devices correctly, and allows receiving devices to reject information from neighboring devices that are within the wireless communication range but not part of the particular system. Devices can be made aware of each other, and consequently each other's address, through a process of "binding" where address identifiers (IDs) are exchanged. A bound set of communication devices know the addresses of the other devices, and know which addresses from which it should accept messages. In prior systems, binding has been performed manually by way of an installer who places the devices in an active binding mode that causes the devices to exchange their address IDs before exiting the binding mode. Among other things the invention facilitates device authorization and/or message acceptance to be effected between two or more devices, as if the devices had been bound together, without the need to perform such a binding process.

In one embodiment, devices can bypass such binding processes. Instead two or more devices can effectively become bound to one another, at least for purposes of communicating messages or other data, by a common association with one or more other devices. For example, if (at least) two communicating devices are privy to certain data or information associated with a third device, then that certain information of the third device can be used to authorize communications between the two communicating devices. This is due to the respective trust between the communicating devices resulting from those devices being similarly privy to that information of the third device. This "binding by association" provides numerous advantages described herein and/or which will become apparent to those skilled in the art from an understanding of the description provided herein.

Figure 1:
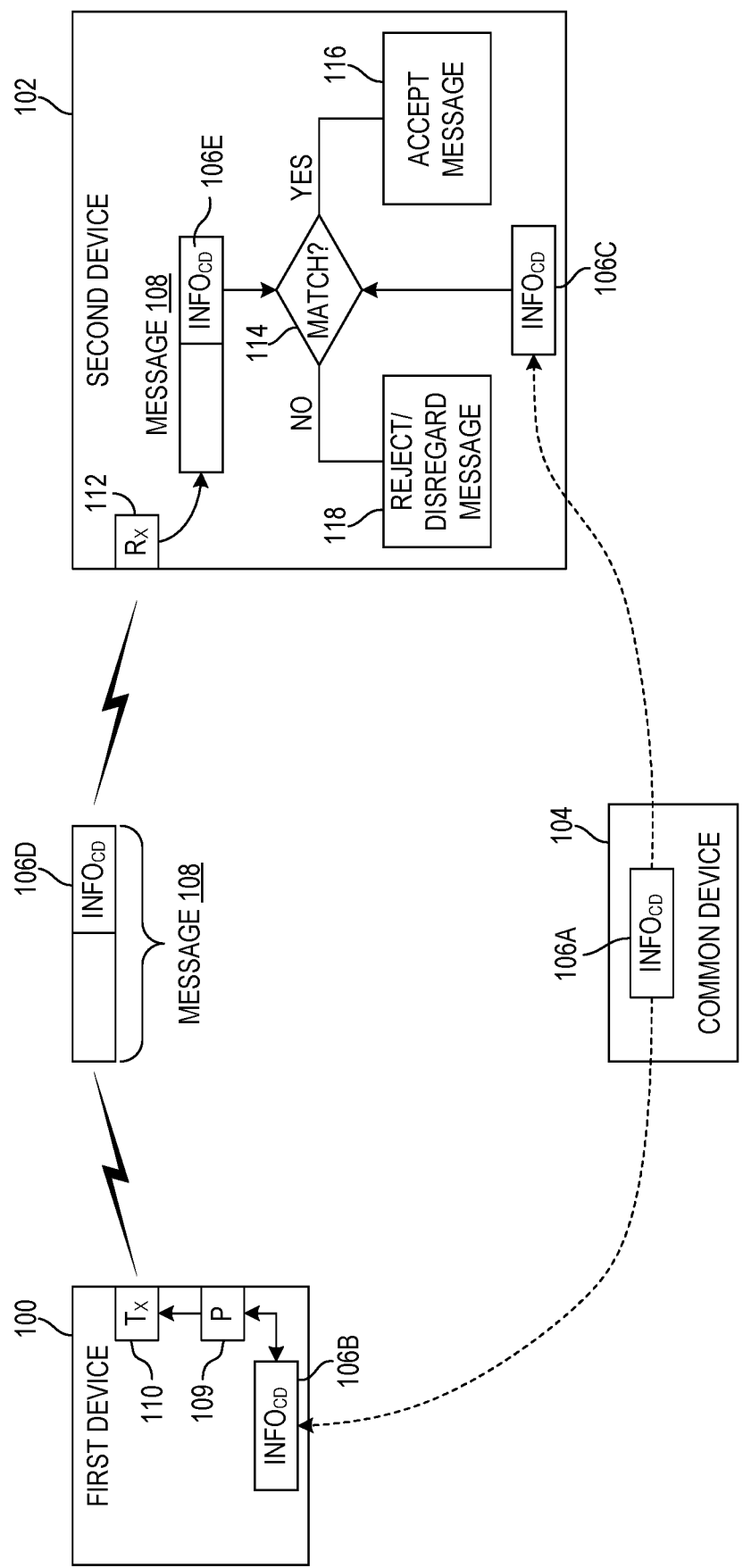
FIG. 1 is a block diagram of a representative embodiment of a system of devices incorporating principles of the present invention.

FIG. 1 is a block diagram of a representative embodiment of a system of devices incorporating principles of the present invention. While any number of devices may be involved in the communications, FIG. 1 illustrates a two-device system including a first device 100 and a second device 102. If these devices 100, 102 had not previously undergone a binding process, then a receiving device would not know if a received message was intended for the receiving device or was inadvertently received from a neighboring system to which it is within a wireless communication range. Whether the first 100 and second 102 devices were intentionally or unintentionally not bound to one another, they can still communicate using principles of the present invention.

The embodiment of FIG. 1 includes another device in the system, depicted as the common device 104, includes some data or other information $INFO_{CD}$ 106A. The word "common" is not intended to connote any particular aspect of the device 104 itself, but rather indicates that it is commonly available to all of the relevant devices 100, 102. The information $INFO_{CD}$ 106A may include any data generated at and/or received by the device 104. For example, the $INFO_{CD}$ 106A may represent or include the address of the device 104.

This $INFO_{CD}$ 106A is obtained by each of the devices 100, 102 that will ultimately use that $INFO_{CD}$ 106A to authorize communications therebetween. The information $INFO_{CD}$ 106B, 106C may be received from the common device 104 at the respective device 100, 102. Alternatively one of the devices 100, 102 can generate the $INFO_{CD}$ 106B, 106C and provide it to the common device for later retrieval by the other device 100, 102.

For example, the $INFO_{CD}$ 106A may represent the address of the common device 104, which is exchanged with the first device 100 when the first device 100 binds itself to the common device 104. Similarly the $INFO_{CD}$ 106A may be exchanged with the second device 102 when the second device 102 binds itself to the common device 104.

Regardless of the type of information 106A or how it came to be stored at the first 100 and second 102 devices, the information 106A is used to effectively bind the devices 100 and 102 for purposes of communicating therebetween. By way of their common association with the common device 104, they each obtain the information 106A, which is shown as $INFO_{CD}$ 106B and $INFO_{CD}$ 106C at devices 100, 102 respectively.

Assume that the first device 100 wants to send a message(s) to any one or more other devices 102. In one embodiment the first device 100 sends a message 108, such as broadcasting the message 108, such that it can be received by other devices 102 that prove to be bound to the first device 100 by way of its association with the common device 104. A processor (P) 109 or other circuitry may be employed to properly frame the message. A transmitter ($T_X$) 110 of the first device transmits the message 108 that includes the information $INFO_{CD}$ 106D that is associated with the common device 104 and was obtained by the first device $INFO_{CD}$ 106B. The common information $INFO_{CD}$ 106A may be unique to the common device 104, such as the device address of the common device 104.

A receiver $R_X$ 112 at the second device 102 receives the message(s) 108, including the $INFO_{CD}$ which is shown as $INFO_{CD}$ 106E when received at the second device 102. It is then determined whether the second device 102 is also associated with the common device 104 by comparing the received information $INFO_{CD}$ 106E to stored information. In the illustrated embodiment, it is assumed that the second device 102 had indeed previously stored the information $INFO_{CD}$ 106C through binding with the common device 104 or as a result of any other association with the common device 104. Therefore, a match 114 of the $INFO_{CD}$ 106E and $INFO_{CD}$ 106C occurs, thereby indicating that the message will be accepted 116. If a device 102 did not previously store the information $INFO_{CD}$ 106C, no match would occur, and the device 102 would reject or otherwise disregard the message 118. In this manner, a common association of the first and second devices 100, 102 can use information $INFO_{CD}$ 106A affiliated with the common device 104 to effectively bind the devices 100, 102 at least for purposes of communicating messages therebetween.

As will be described in the ensuing description, one embodiment involves using the stored information $INFO_{CD}$ 106B at the first device 100 as a broadcast address ID. The second device 102 (i.e. the receiving device in this example) can then search its storage to determine whether it stored information $INFO_{CD}$ 106C from a common device 104 that will be used by the second device 102 as its own address for received broadcast messages. If the second device 102 had stored the $INFO_{CD}$ 106C through a binding process with the common device 104, it then effectively becomes bound to the first device 100 because it knows from the broadcast address ID that the first device 100 had also bound itself to the common device 104. The second device 102 is therefore willing to receive messages from other devices 100 that also bound themselves to the same common device 104.

Figure 2:
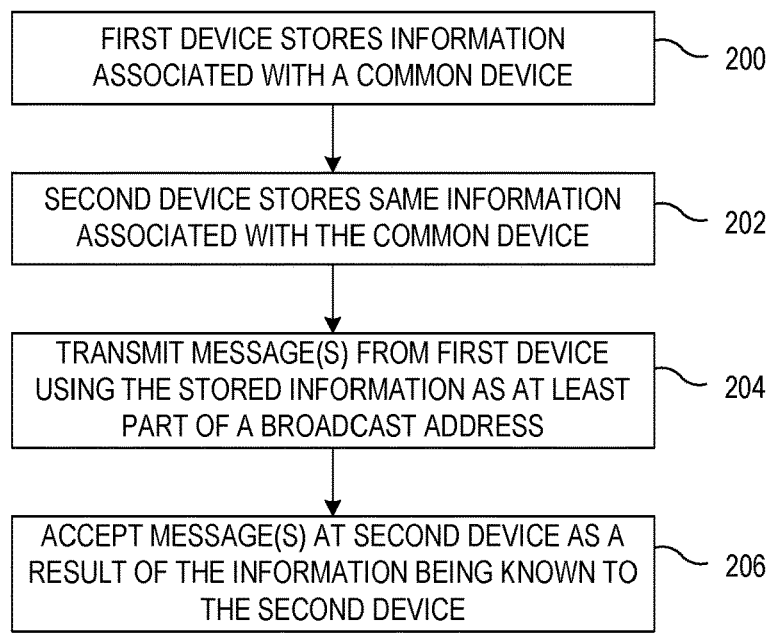
FIG. 2 is a flow diagram illustrating a representative embodiment of a method for binding two entities or devices together using information of a third device.

FIG. 2 is a flow diagram illustrating a representative embodiment of a method for binding two entities or devices together using information of a third device. In this embodiment, the first and second devices represent the devices that will ultimately communicate a message(s) therebetween. The first device stores 200 information associated with a third device, referred to as a common device. The second device also stores 202 the information associated with the common device, and therefore both the first and second devices have stored the same information associated with the common device. A message(s) is transmitted 204 from the first device using the stored information as at least part of a broadcast message. The message(s) is accepted 206 at the second device as a result of the same information received in the broadcast message being known to the second device. It should be recognized that the first device could similarly receive messages from the second device where the first device's stored information matches the information provided by the second device's broadcast message.

Figure 3:
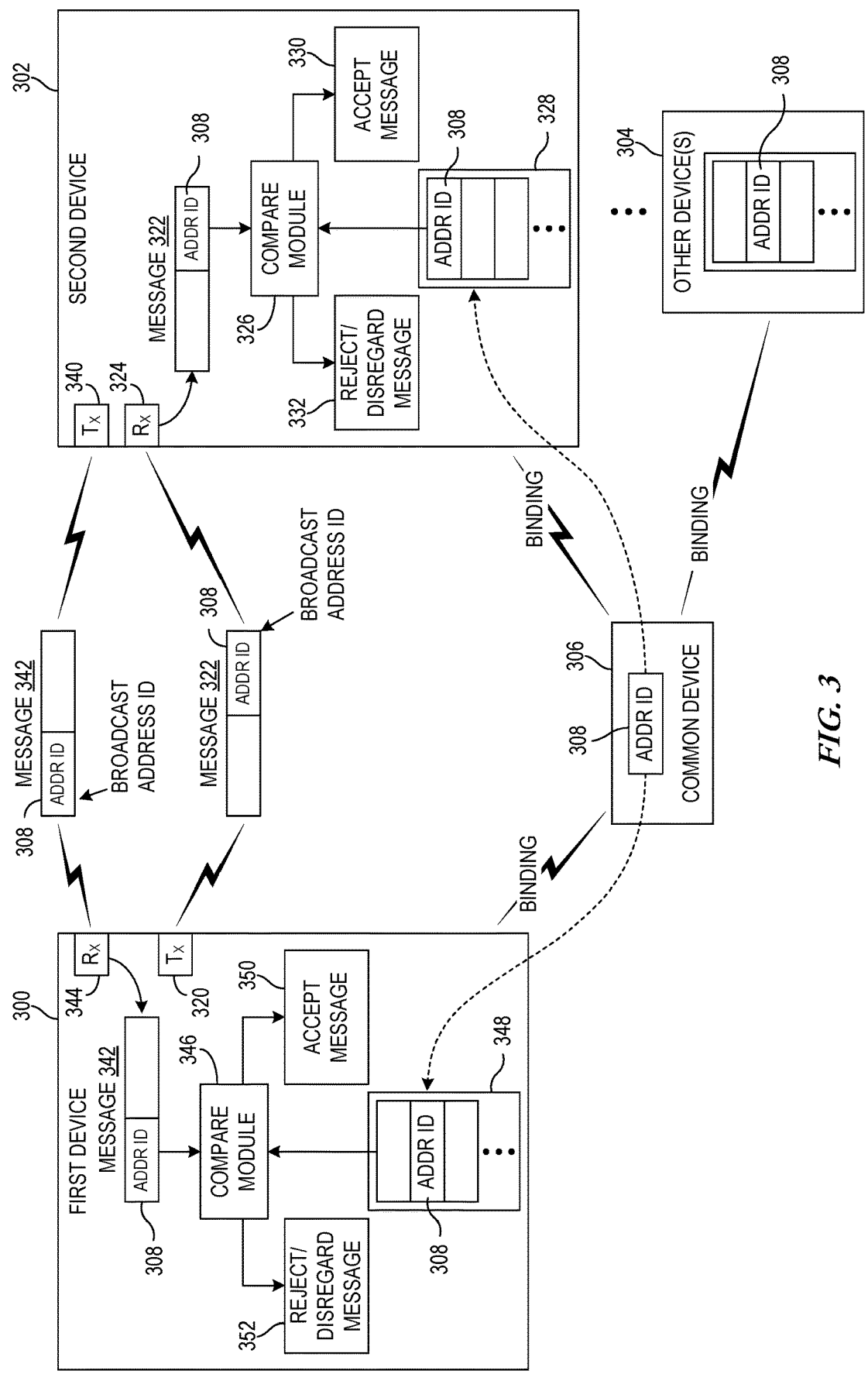
FIG. 3 illustrates a more particular example of a system for communicating messages between multiple devices using the principles of the invention.

FIG. 3 illustrates a more particular example of a system for communicating messages between multiple devices using the principles of the invention. The embodiment illustrates how messages can be communicated between a plurality of devices, including a first device 300, second device 302, and possibly additional devices 304. In this embodiment, each of the devices 300, 302, 304 has undergone a binding process with a common device 306, which enables each of the devices 300, 302, 304 to communicate messages to and/or from the common device 306. Through this binding process, each of the devices 300, 302, 304 learns the address ID (ADDR ID) 308 of the common device, also shown as ADDR ID 308 stored in each of the devices 300, 302, 304.

For example, the first device 300 can be bound to the common device 306 by placing both the first device 300 and the common device 306 into an active binding mode. One example in which this can be accomplished is by having an installer manually activate user interface mechanisms on both the first device 300 and the common device 306 to cause these respective devices to enter the binding mode. When in binding mode, the first device 300 and common device 306 will communicate enough information to allow the first device 300 and the common device 306 to transmit and receive information from each other, or at least to allow the first device 300 to receive information from the common device 306. In one embodiment the binding information that is communicated to the first device 300 includes the address ID 308 of the common device 306. The binding process is then terminated, and the first device 300 stores the common devices address ID 308 as shown by ADDR ID 308. In this way, if the first device 300 receives messages from a device having the address ID 308, the first device 300 knows that these messages are coming from a device to which it has been bound to, and it will accept the messages. Second device 302 and any other devices 304 can similarly bind to the common device 306, thereby storing the ADDR ID 308 of the common device 306.

It is noteworthy that none of the first device 300, the second device 302, or other devices 304 are bound to one another. They are, however, each bound to the common device 306. In accordance with the invention, any of the first 300, second 302 or other devices 304 can communicate with one another without having to undergo a device-to-device binding process such as they did in order to communicate with the common device 306. Rather, any of the devices 300, 302, 304 can communicate with one another due to their common association with the common device 306.

Particularly, it is first assumed that the first device 300 wants to broadcast a message to any other device 302, 304 that may be in the system. The transmitter 320 of the first device 300 broadcasts a message 322 using the stored ADDR ID 308, which corresponds to the ADDR ID 308 of the common device 306. The ADDR ID 308 in the message 322 is used as a broadcast address ID. If any of the second 302 or other 304 devices had previously been bound to the common device 306, and therefore are storing the ADDR ID 308, these devices 302, 304 can receive the message 322. For example, the receiver 324 of the second device 302 compares 326 the ADDR ID 308 from the message 322 to a table (or other structure) 328 of bound devices. If the ADDR ID 308 is present in the table 328, the comparison reveals a match and the message 322 is accepted 330. Otherwise it is assumed that the message 322 was not intended for the second device 302, and it is rejected and/or discarded 332.

The second device 302 can also serve as the broadcaster of a message(s). Due to the common affiliation with the common device 306, any devices 300, 304 that have also been bound to the common device 306 can receive broadcast messages from the second device. The transmitter 340 of the second device 302 broadcasts a message 342 using the stored ADDR ID 308, which corresponds to the ADDR ID 308 of the common device 306. The ADDR ID 308 in the message 342 is used as a broadcast address ID. If any of the first 300 or other 304 devices had previously been bound to the common device 306, and therefore are storing the ADDR ID 308, these devices 300, 304 can receive the message 342. For example, the receiver 344 of the first device 300 compares 346 the ADDR ID 308 from the message 342 to a table (or other structure) 348 of bound devices. If the ADDR ID 308 is present in the table 348, the comparison reveals a match and the message 342 is accepted 350. Otherwise it is assumed that the message 342 was not intended for the first device 300, and it is rejected and/or discarded 352.

Thus, in the embodiment of FIG. 3, the sending device 300, 302 sends a broadcast message to the address of the common device 306 (i.e., the ADDR ID 308). The receiving device 300, 302 uses that address to receive the message correctly. Particularly, if the first device 300 wants to send a message to any listening devices such as second device 302, the first device 300 addresses the message to ADDR ID 308. The second (receiving) device 302 recognizes that it is not its own physical address, but is configured to review its list of other addresses to which it has already been bound. If the second device 302 finds it in its list, it will accept that message.

Figure 4A:
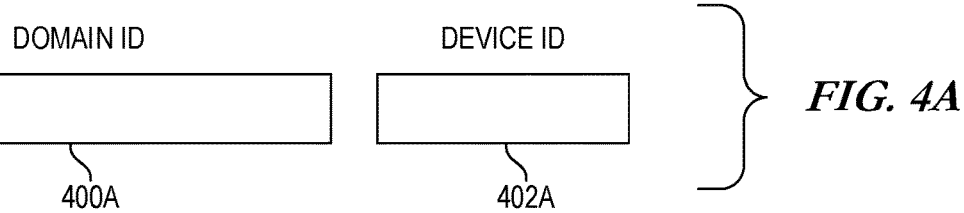
FIGS. 4A and 4B illustrate an example of how the device address of the common device can be used as the broadcast message while allowing the common device to reject the broadcast message.
Figure 4B:
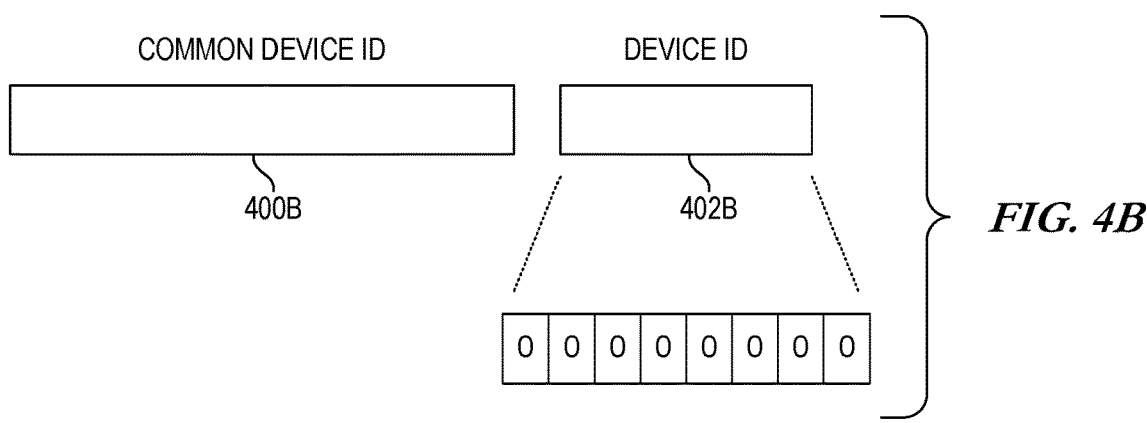

If the first device 300, for example, broadcast a message using the address of the common device 306, the common device 306 could actually receive the message even though it was intended for one of the other communicating devices 302, 304. To prevent this, one embodiment involves the use of two different identifiers. FIGS. 4A and 4B illustrate an example of how the device address of the common device 306 can be used as the broadcast message while allowing the common device 306 to reject the broadcast message.

FIG. 4A is first considered in connection with FIG. 3. In one embodiment, a destination domain ID 400A is used as part of the broadcast address when device-to-device messages between non-bound devices are communicated. The collection of devices that are intended to operate together in an area is generally referred to herein as a "group." In one embodiment, the communication devices (e.g. 300, 302, 304, etc.) are in different groups, and operate with other devices in their respective groups. In other embodiments, one or more of the communication devices (e.g. 300, 302, 304) may be part of the same group. During installation or at other designated times, each device 300, 302, 304 generates or otherwise obtains a random group ID, which in one embodiment is a 16-bit group ID. A group ID may be used in messages to restrict its messages to only be received within its group. The domain ID 400A may correlate to the group ID for certain messages, such as point-to-point messages. In embodiments of the invention, the domain ID 400A reflects the common device's 306 address ID, as described more fully below. The device ID 402B represents the address of the particular device to which a message is being sent.

When broadcasting a message(s) in accordance with the invention, one embodiment involves using the common device's 306 device ID as the domain ID 400A, as depicted by the common device ID 400B of FIG. 4B. The common device 306 will not receive the broadcast message because the device ID 402B will not have the unique address of the common device 306, but rather will include a generic address that each of the devices 300, 302, 304, etc. will recognize for itself. In one embodiment, the device ID 402B is an eight-bit value set to "0" when broadcasting messages between the devices 300, 302, 304. Thus, the domain ID 400A/B takes on the value of the device ID of the common device 306, and uses the address of the intended broadcast recipients (e.g. 0) in the device ID 402A/B field.

The functions described in connection with the invention may be used in any device in which data is to be communicated. In one embodiment, the systems, apparatuses and methods of the invention are implemented in environmental monitoring and control systems, such as HVAC systems. Representative examples of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 5:
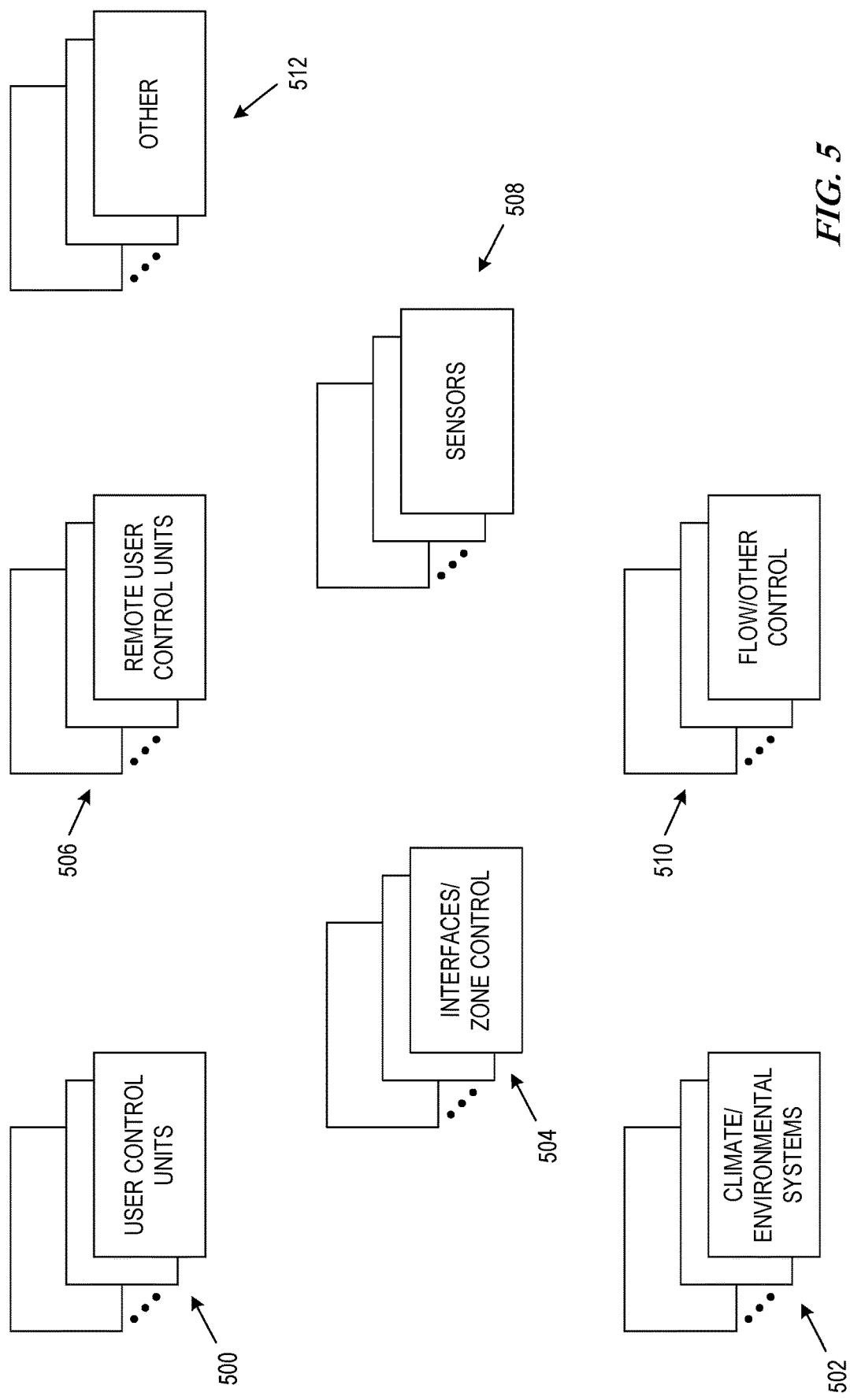
FIG. 5 is a block diagram generally illustrating representative HVAC elements and devices in which air interfaces may be used.

FIG. 5 is a block diagram generally illustrating representative HVAC elements and devices in which air interfaces may be used. FIG. 5 depicts one or more user control units 500, such as wireless thermostats where users can enter a temperature setpoint designating a desired temperature. Other examples of user control units 500 include humidity control units, lighting control units, security control units, etc. Climate or environmental systems 502 may include the equipment to cause the desired action to occur. One such system 502 is an HVAC system, which includes equipment to raise or lower temperature, humidity, etc. User control units 500 may communicate directly with such climate/environmental systems 502, and/or may communicate via one or more interfaces or zone controllers 504. Remote user control units 506 provide portable user control, such as providing a visual and/or audio interface to the user, and allowing the user to change environmental setpoints, check status, etc. Sensors 508 may be used to sense environmental conditions, and may be discrete devices (e.g. outdoor air/temperature sensor) or may be integrated into user control units 500. Flow and other control equipment 510 may also be used, such as dampers, ultraviolet air treatment lamps, etc. Any of these devices may need to communicate information amongst themselves and/or with other devices 512, in which the present invention may be utilized.

When these devices communicate wirelessly with one another via radio frequency (RF) or other wireless means, there is a reasonable chance that a wirelessly communicating device may experience interference from neighboring systems or other devices of the same system. Binding through common association as set forth herein can be used in such systems to avoid such interference and ensure proper delivery of messages between devices.

Some devices in the system may be powered by power sources and communicate via wire and/or over the air, while other devices may be battery-powered and communicate information wirelessly. Any device may be powered in any desired manner. In one embodiment, a host or other device may be powered by an AC voltage such as 24 volts AC (VAC), and may remain powered on while operating in the system. In some embodiments, devices referred to as hosts in the prior figures and description can correspond to such powered devices, or alternatively such hosts may be powered in other manners such as by battery or other DC voltage, energy harvesting, etc. In other embodiments, prior references to hosts can refer to any device in the system. Other devices that are powered by battery (e.g., clients) may enter a sleep mode to preserve battery life. In one embodiment, a collection of devices including a host(s) and its clients may be referred to as a "group," and a collection of physical groups that communicate through their host(s) may be referred to as a "system." However, a "system" as otherwise used herein does not require any such groupings, and may involve as few as two communicating devices.

Figure 6A:
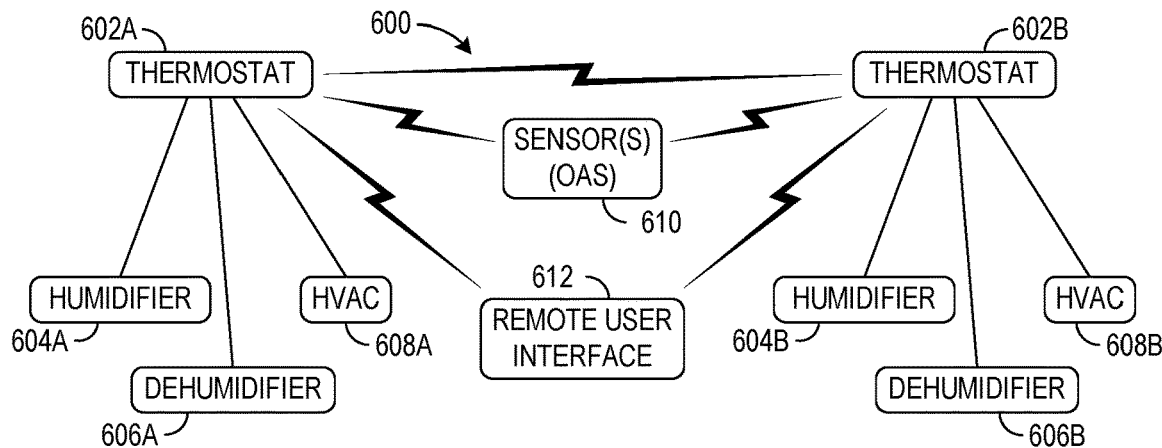
FIGS. 6A-6C depict some representative examples of clients, hosts, groups and systems that benefit from communicating in accordance with the present invention.
Figure 6B:
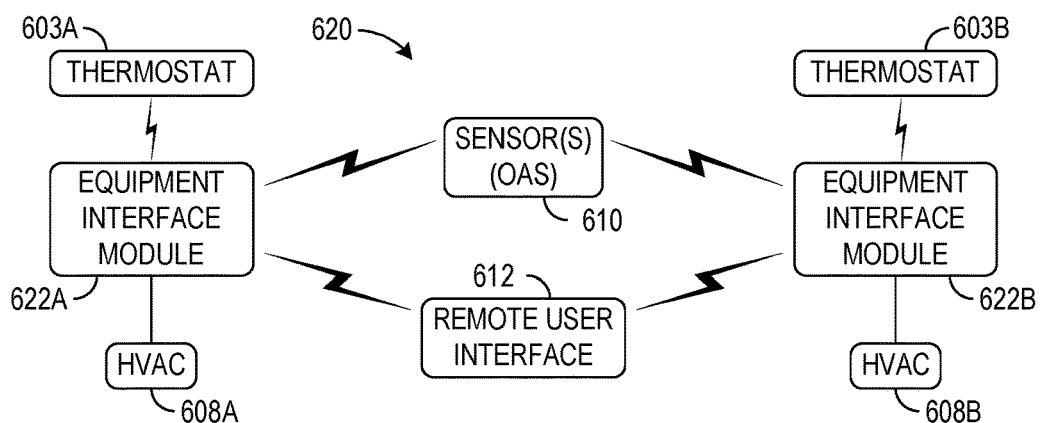
Figure 6C:
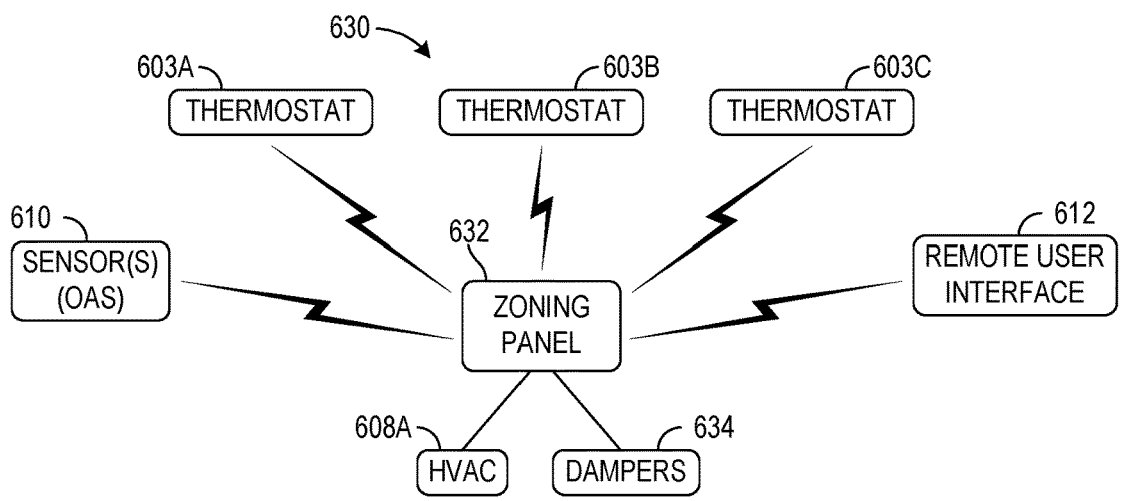

FIGS. 6A-6C depict some representative examples of clients, hosts, groups and systems that benefit from communicating in accordance with the present invention. Like reference numbers are used for analogous devices where appropriate in FIGS. 6A-6C. Each of the devices depicted in FIGS. 6A-6C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 6A illustrates one system 600 where one or more thermostats 602A, 602B are configured as hosts, and may be powered by an AC power source, DC source or other power source. Each thermostat may be wired to other equipment such as humidifiers 604A, 604B, dehumidifiers 606A, 606B, and HVAC equipment 608A, 608B. Battery powered "clients" in the embodiment of FIG. 6A include one or more sensors 610, such as an outdoor air sensor (OAS), and one or more remote user interfaces (RUI) 612 which provide users with remote access and control of environmental conditions in the system 600. In accordance with the invention, hosts such as the thermostats 602A and 602B can communicate without having to undergo a thermostat-to-thermostat binding process, but rather can communicate by association to one or more other devices commonly bound to each of the thermostats 602A, 602B (e.g. OAS 610).

FIG. 6B illustrates another exemplary system 620 where one or more thermostats 603A, 603B are configured as clients, and may be powered by batteries. Each thermostat 603A, 603B respectively communicates wirelessly with an equipment interface module (EIM) 622A, 622B that may be AC-powered and wired to respective HVAC equipment 608A, 608B. In this embodiment, each EIM 622A, 622B that operates as a host may communicate with various clients. For example, host EIM 622A can communicate wirelessly with clients including the thermostat 603A, the sensor(s) 610, and the RUI(s) 612. Similarly host EIM 622B can communicate wirelessly with clients including the thermostat 603B, the sensor(s) 610, and the RUI(s) 612. Clients, or hosts such as EIMs 622A, 622B can implement the principles of the present invention by foregoing any formal binding process and "binding by association" with one or more other devices.

FIG. 6C illustrates another system 630 which utilizes area zoning using a zoning panel 632. In this embodiment, the zoning panel 632 serves as a host that may be AC-powered, and is connected to other equipment such as the HVAC 608A and dampers 634. Clients include the thermostats 603A, 603B, 603C, a sensor(s) 610, RUI 612, and possibly dampers 634 when such dampers are wirelessly controlled. Clients, or hosts such as the zoning panel 632 can implement the principles of the present invention to communicate with one another by virtue of their association with a common device.

It should be noted that the exemplary environments described in FIGS. 5 and 6A-6C are provided merely for purposes of facilitating an understanding of representative systems in which the principles of the present invention may be employed. From the description provided herein, one skilled in the art can readily appreciate that the invention may be employed in any system of two or more communicating devices where messages or other data is communicated therebetween.

Figure 7:
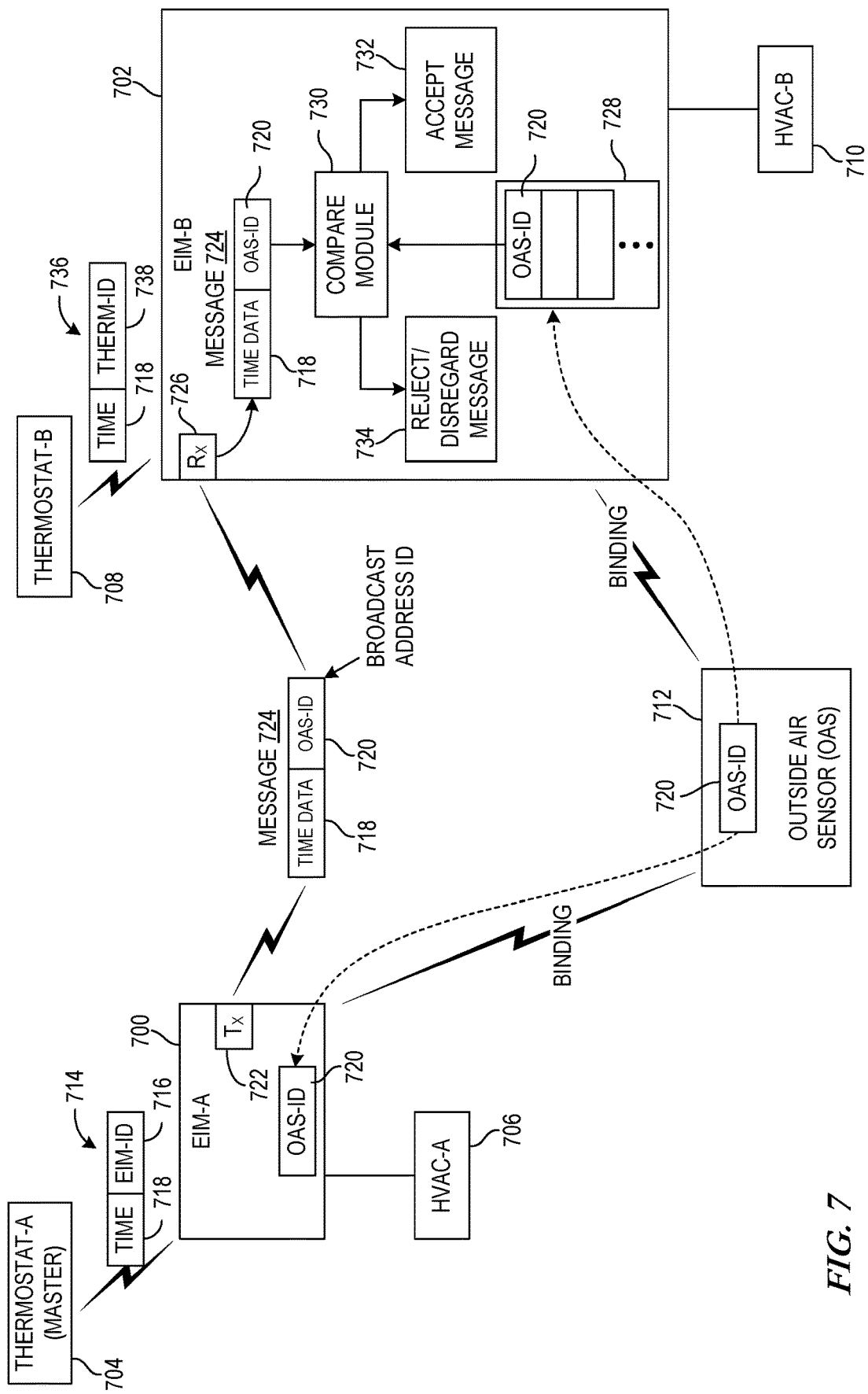
FIG. 7 illustrates a particular example of a system that utilizes embodiments of the present invention for communicating messages between host devices in an environmental control system.

The present invention may be used in, for example, environmental control systems such as those described in connection with FIGS. 5 and 6A-6C. FIG. 7 illustrates a particular example of a system that utilizes embodiments of the present invention for communicating messages between host devices in an environmental control system. In the example of FIG. 7, a configuration such as that described in connection with FIG. 6B is assumed. This is merely for purposes of example, as the invention is capable of use in communicating between any devices in any configuration.

The embodiment of FIG. 7 includes an equipment interface module-A (EIM-A) 700 and an EIM-B 702 that operate as host devices in this example. Each EIM 700, 702 serves as an interface between various devices. For example, EIM-A 700 can wirelessly communicate with thermostat-A 704, and is coupled to a heating, ventilation and air conditioning (HVAC) unit 706. Similarly, EIM-B 702 can wirelessly communicate with thermostat-B 708, and is coupled to HVAC 710. Both EIMs 700, 702 wirelessly communicate, or at least receive information from, the outside air sensor (OAS) 712. As described more fully below, since the OAS 712 is a device that both EIMs 700, 702 have bound with, the OAS 712 can be used as the common device and its address ID can be used by the EIMs 700, 702 to communicate with one another.

For purposes of example, it is assumed that communication between EIM-A 700 and EIM-B 702 will occur in order to synchronize time information in the thermostats 704, 708. Particularly, the example assumes there is a clock in each thermostat 704, 708. Among other things, a clock allows a user to program environmental control settings at certain times. It may be beneficial to ensure that the clocks in multiple thermostats 704, 708 are set to the same time. In one embodiment, when one thermostat-A 704 is manually set, it becomes the master clock that can be used as the reference time for synchronizing other clocks in the system.

The EIMs 700, 702 are bound to their respective thermostats 704, 708, but the EIMs 700, 702 are not bound to one another. There are any number of reasons that two devices may not be bound to one another. For example, there may be little reason to bind the EIMs 700, 702 together if they seldom need to communicate. Further, the EIMs 700, 702 may have limited user interfaces where engaging in a manual binding process may be difficult or impossible. Thus, if EIM-A 700 is to send data (such as time synchronization data for the thermostat-B 708) to another EIM-B 702, there should be some binding so that data sent from EIM-A 700 properly reaches EIM-B 702 without affecting neighboring systems within a wireless communication range of the EIMs 700, 702. The present invention enables such communication between devices that are not bound together in advance.

Returning to the example, assume that a clock (not shown) in the thermostat-A 704 has been manually set. At some time, it may be desirable to synchronize the clock in other thermostats, such as thermostat-B 708. For example this may occur once per day. The thermostat-A 704 sends a message 714 to the address (EIM-ID 716) of its EIM-A 700 which includes time synchronization data 718. The EIM-A 700 had previously performed a binding operation with an OAS 712, and thus includes in its table the address OAS-ID 720. Using the OAS-ID 720, EIM-A's transmitter $T_X$ 722 wirelessly broadcasts a message 724 including the time data 718 using the OAS-ID 720 as the broadcast address. The receiver $R_X$ 726 at EIM-B 702 receives the message 724, and recognizes that it is a broadcast message, and searches its local table 728 for the OAS-ID 720. Since this example assumes EIM-B 702 has previously obtained the OAS-ID of the OAS 712 (e.g. through binding), the compare module 730 recognizes a match when comparing the received OAS-ID 720 in the message 724 and the OAS-ID 720 in its table 728. In this case, the EIM-B 702 accepts 732 the message 724 and processes the message. Otherwise, the message 724 would be rejected 734.

The EIM-B 702 can then send a message 736 to the thermostat-B 708 by directing the message 736 to the address (THERM-ID 738) of the thermostat-B 708. The message 738 can include the time data 718 from which the thermostat-B 708 can adjust its clock. It should be recognized that this time synchronization example is merely representative of types of data transfers that may involve previously non-bound devices (e.g. EIMs 700, 702) that are bound by association to another device (e.g. OAS 712) in accordance with the principles of the present invention.

The functions associated with the present invention may be performed by discrete circuitry and/or computing system hardware. In one embodiment, the devices that will communicate with one another using the address ID of a common device utilize a processor(s), CPU(s), computer(s), or other processing system to perform the stated functions. It should be understood that reference to a "processor" does not require a single processor or controller chip, but rather refers to the processing circuitry that executes programs to perform the various functions. Alternatively, part or all of the functions may be implemented using discrete circuitry. Accordingly, hardware, firmware, software or any combination thereof may be used to perform the various functions and operations described herein.

An example of a computing arrangement capable of executing programs to perform the various functions described above is shown in FIG. 8. The functional modules used in connection with the invention may reside in any device in which data is to be communicated by binding using the address ID or other information associated with a common device. Devices implementing the present invention include thermostats, environmental control devices, local and remote interfaces, and/or other devices that may be used in any system involving the communication of data between devices. Representative examples of such systems include HVAC systems, security systems, area control systems, automotive systems, etc.

Figure 8:
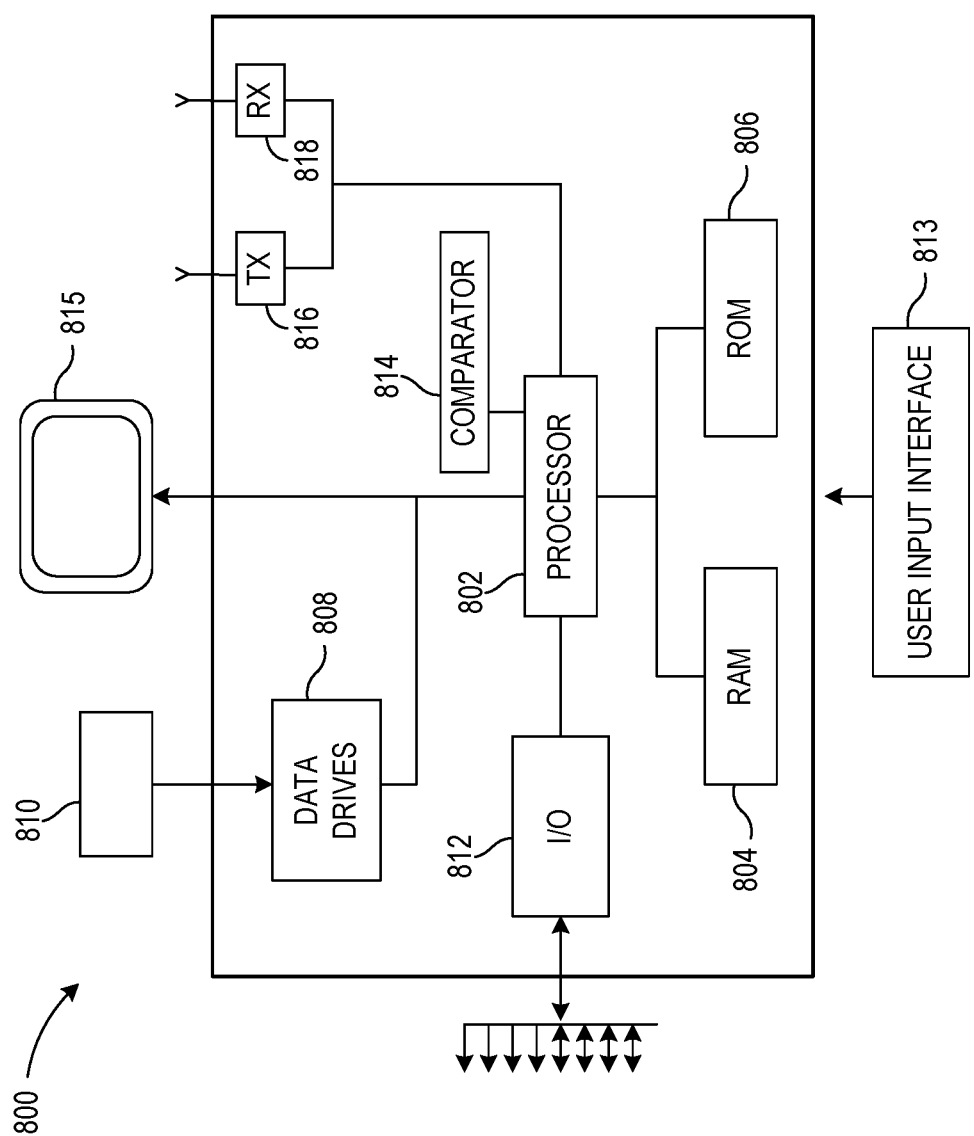
FIG. 8 illustrates a representative computing arrangement capable of executing programs to perform various functions of the invention.

Referring to FIG. 8, the representative computing or processing arrangement 800 includes a processing device(s), such as a central processing unit (CPU) 802. The processor can execute instructions to perform functions of the present invention. For example, the processor can frame the broadcast messages that are sent from a first device to a second device(s) using the address ID of a third device as the broadcast address ID. A message frame may include, for example, a preamble, synchronization data, message length indicator, message type indicator, source address, data, correction bits (e.g. CRC data), etc. The message frame also includes one or more destination address fields (e.g. domain ID 400A and device ID 402A of FIG. 4A). The processor can also coordinate retrieving the address ID of the common device and inserting it at the correct location of the message prior to its broadcast transmission. Processors at the receiving device can parse the received message to identify the appropriate information contained therein, including the broadcast address ID. The receiving device processor can retrieve stored address ID information, and compare the received broadcast address ID to the stored address IDs to determine if there is a match. The processor can further be programmed to accept the message or reject the message based on the result of the comparison. These and other functions described herein can be performed by a processor(s) programmed to do so. It should be noted that discrete circuits can be used in lieu of or in addition to one or more processors.

The computing system 800 may include some storage, such as any one or both of random access memory (RAM) 804, read-only memory (ROM) 806, etc. For example, the address IDs of other devices to which the device has been bound may be stored. The computing arrangement 800 may instead or additionally include one or more data drives 808, such as disk drives, optical drives and/or other drives capable of receiving programs and/or data on transportable media 810. In one embodiment, software for carrying out the operations in accordance with the present invention may be stored and distributed on such media or other form of media capable of portably storing information. The software may also be transmitted to the computing arrangement 800 via data signals, such as being downloaded electronically via a network.

The processor 802 may communicate with other internal and external components, including removable storage (e.g. FLASH) through input/output (I/O) circuitry 812. I/O circuitry may also communicate control signals, communication signals, and the like. A user input interface 813 may be provided such as a mouse, keyboard/keypad, microphone, touch pad, trackball, joystick, touch screen, voice-recognition system, etc. Similarly, a user output device, such as a display 815 or speaker, may also be provided.

Where comparisons of received and stored data are performed, this can be facilitated by one or more comparators. Comparators may be implemented using hardware, software operable in connection with the processor 802, or some combination of hardware and software. A comparator 814 may be integrally programmed as part of the processor 802 operation, or alternatively may be a separate comparator 814.

The representative computing arrangement 800 includes a transmitter(s) TX 816 and/or a receiver(s) RX 818. Such TX 816 and RX 818 components may be implemented as discrete components, or aggregated such as in the case of a transceiver. In one embodiment, the TX 816 and/or RX 818 are RF components capable of wirelessly communicating information via radio frequency waves.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method for communicating in a system that has a first device, a second device and a third device, the method comprising:

temporarily placing the first device and the second device into a binding mode to bind the first device and the second device using a binding procedure, wherein in the binding procedure, the first device receives a unique device identifier from the second device and stores the unique device identifier of the second device in a binding table of the first device;

temporarily placing the third device and the second device into a binding mode to bind the third device and the second device using the binding procedure, wherein in the binding procedure, the third device receives the unique device identifier from the second device and stores the unique device identifier of the second device in a binding table of the third device; and without temporarily placing the first device and the third device into a binding mode to bind the first device and the third device using the binding procedure, communicating between the first device and the third device by virtue of the first device and the third device each being bound to the second device using the binding procedure;

wherein communicating between the first device and the third device comprises:
  broadcasting, by the first device, a first broadcast message that includes the unique device identifier of the second device; and
  accepting, by the third device, the first broadcast message from the first device because the unique device identifier of the second device in the first broadcast message matches an entry in the binding table of the third device.

2. The method of claim 1, wherein in the binding procedure between the first device and the second device, the second device receives a unique device identifier from the first device and stores the unique device identifier of the first device in a binding table of the second device.

3. The method of claim 1, wherein in the binding procedure between the third device and the second device, the second device receives a unique device identifier from the third device and stores the unique device identifier of the third device in the binding table of the second device.

4. The method of claim 1, wherein in the binding procedure between the first device and the second device, the first device wirelessly receives the unique device identifier from the second device.

5. The method of claim 1, wherein in the binding procedure between the third device and the second device, the third device wirelessly receives the unique device identifier from the second device.

6. The method of claim 1, wherein the communicating between the first device and the third device comprises wireless communication.

7. The method of claim 1, wherein the communicating between the first device and the third device further comprises the third device broadcasting a second broadcast message that includes the unique device identifier of the second device, and the first device accepts the second broadcast message from the third device because the unique device identifier of the second device in the second broadcast message matches an entry in the binding table of the first device.

8. The method of claim 1, wherein the first device comprises a first building controller for controlling at least part of a building system, the third device comprises a second building controller for controlling at least part of the building system, and the second device comprises a sensor, wherein the first building controller is bound to the sensor using the binding procedure and the second building controller is bound to the sensor using the binding procedure but the first building controller is not bound to the second building controller using the binding procedure.

9. The method of claim 8, wherein the first building controller comprises a first thermostat, the second building controller comprises a second thermostat, and the sensor comprises an outdoor air temperature sensor.

10. The method of claim 8, wherein the first building controller comprises a security controller and the second building controller comprises a second security controller.

11. The method of claim 8, wherein the first building controller comprises a security controller and the second building controller comprises an HVAC controller.

12. The method of claim 1, wherein the first device comprises a first building controller for controlling at least part of a building system, the third device comprises a second building controller for controlling at least part of the building system, and the second device comprises a remote user interface, wherein the first building controller is bound to the remote user interface using the binding procedure and the second building controller is bound to the remote user interface using the binding procedure but the first building controller is not bound to the second building controller using the binding procedure.

13. The method of claim 1, wherein the first device comprises a first HVAC device, the third device comprises a second HVAC device, and the second device comprises a zone control panel, wherein the first HVAC device is bound to the zone control panel using the binding procedure and the second HVAC device is bound to the zone control panel using the binding procedure but the first HVAC device is not bound to the second HVAC device using the binding procedure.

14. The method of claim 1, wherein broadcasting the first broadcast message comprises broadcasting, by the first device, the first broadcast message including a second unique device identifier configured to cause the second device to reject the broadcast message.

15. A method for communicating in a system that has a first building control device and a second building control device, the method comprising:
  wirelessly broadcasting a message by the first building control device;
  receiving the message by the second building control device;
  checking, by the second building control device, if the message includes an indication that the first building control device is bound to a common device to which the second building control device is also bound, wherein the common device is separate from the first building control device;
  accepting, by the second building control device, the message in response to determining that the message includes the indication that the first building control device is bound to the common device; and
  disregarding, by the second building control device, the message in response to determining that the message does not include the indication that the first building control device is bound to the common device.

16. The method of claim 15, wherein the first building control device comprises a first HVAC controller, the second building control device comprises a second HVAC controller, and the common device comprises an outdoor air temperature sensor.

17. The method of claim 15, wherein the first building control device comprises a security controller.

18. The method of claim 15, wherein the first building control device comprises a lighting controller.

19. A method for communicating in a system that has a first device, a second device, and a third device, the method comprising:
  allowing communication between the first device and the third device when the first device and the third device communicate a unique device identifier of the second device indicating that the first device and the third device are both bound to the second device; and not allowing communication between the first device and the third device when the first device and the third device do not communicate a unique device identifier of the second device indicating that the first device and the third device are not both bound to the second device.

20. The method of claim 19, wherein the first device comprises a first building controller, the third device comprises a second building controller, and the second device comprises a sensor.

* * * * *